United States Patent Office 2,789,743
Patented Apr. 23, 1957

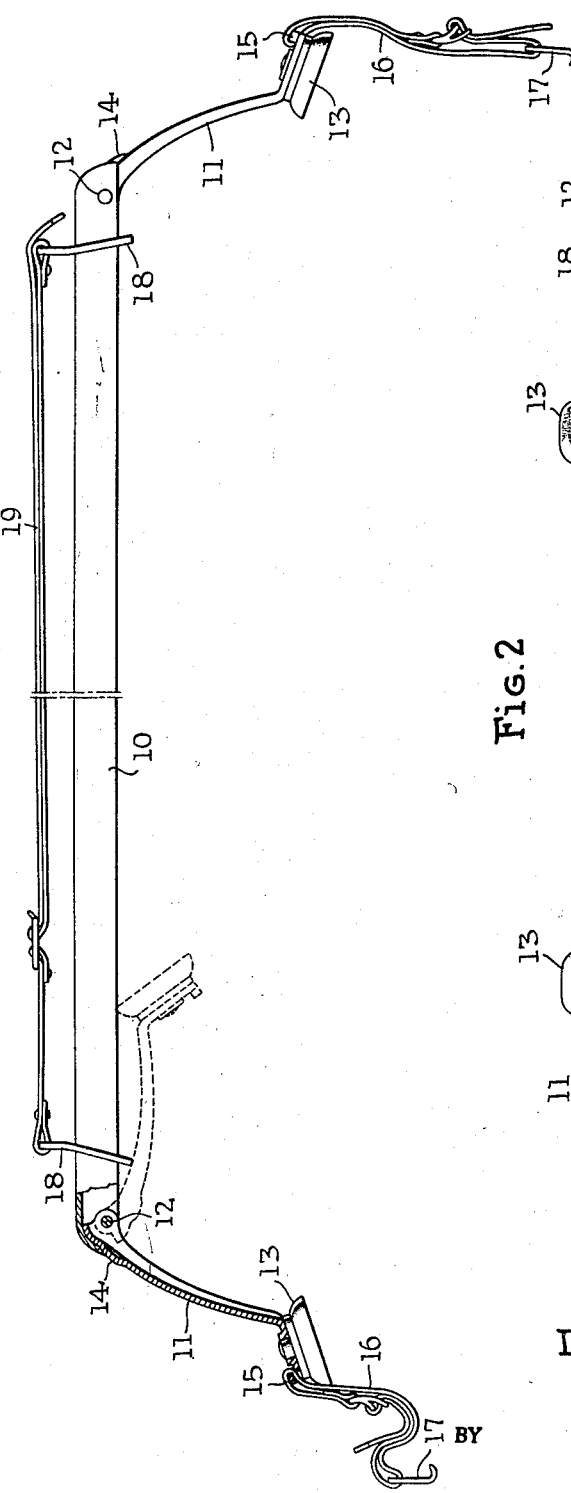
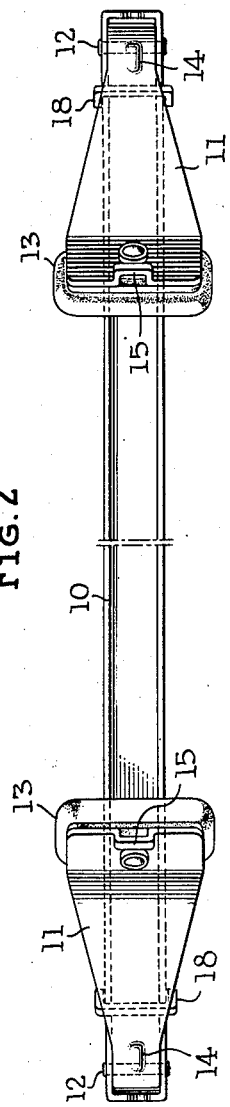
INVENTOR
Daniel Waldman

2,789,743

VEHICLE ATTACHED LUGGAGE CARRIER

Daniel Waldman, Brooklyn, N. Y.

Application February 24, 1955, Serial No. 490,286

6 Claims. (Cl. 224—42.1)

This invention relates to luggage carriers, and more particularly to luggage carriers of the type adapted to be removably supported in spaced relation to the top of an automobile.

Devices of this type are used extensively today and add materially to the carrying capacity of an automobile. In general, however, prior embodiments are bulky and present storage problems when not in use. Accordingly, it is an object of the present invention to provide a luggage carrier of this type which is foldable or collapsible to reduced dimensions in order that it may be conveniently stored and handled.

Other objects will be apparent from the following description, when read in conjunction with the attached sheet of drawing, in which:

Fig. 1 is a side elevation, partly in section, of a preferred embodiment of this invention, and Fig. 2 is a bottom plan view of the device shown in Fig. 1 with the end attaching means in folded position.

In general, this invention comprises an elongated load-supporting member adapted to be removably supported in spaced relation to the top of an automobile. The means for support include a pair of arms pivotally connected to the load-supporting member adjacent the outer ends thereof, each arm having a suction cup mounted on its outer end.

Referring now to the drawings wherein is shown a preferred embodiment of the invention, the load-supporting member 10 is shown as metallic and of channel shape. Adjacent each end of the channel member 10, there is provided an arm 11 pivotally connected to the member 10 by a pin 12. At the opposite end of each arm 11, there is secured a suction cup 13. Outward movement of the arms 11 is limited by a struck-up portion 14 which, when the arms are in operative position, engages an end of the channel member 10. The outer ends of each arm further include an eye portion 15. In order to more securely support the device on the top of an automobile, a strap 16 is threaded through the eye 15 and also through a hook member 17. The latter is for engagement with the outer undersurface of the conventional rain gutter of an automobile. The strap member 16 is, of course, adjustable in length to provide for secure attachment of the device to an automobile top.

Generally, a pair of these devices are placed on an automobile top transversely thereof, at points spaced longitudinally of the vehicle axis. For the purpose of securing luggage or other articles to be carried thereon, each carrier is further provided with a pair of flat plate-like elements 18, each having a pair of openings therein. One of these openings is slightly larger than the cross section of the channel member 10, and the second merely forms an eye for an insertion of the ends of a strap 19. The members 18 may be moved to any desired point on the channel member 10, and when the strap 19 is tightened, they are tilted to engage the channel member and retain their positions.

Figure 2 shows the luggage carrier of this invention minus the straps and with the arms 11 folded inwardly to lie substantially flat against the channel member 10. In this position, the luggage carrier may be conveniently carried and stored when removed from the automobile top.

From the foregoing, it will be apparent that there is herein shown and described a novel and useful automobile top luggage carrier possessing numerous advantages not embodied in prior art devices of this type. Variations in detail are contemplated within the scope of the appended claims.

I claim:

1. A luggage support device for removable attachment to the top of an automobile, comprising in combination: a rigid elongated load-supporting member, having a top load supporting surface and an underside; a pair of relatively short arms, each pivotally connected to said elongated member adjacent the outer ends thereof and depending downwardly therefrom below the underside of said load supporting member; abutment means on each of said arms for coaction with said load supporting member at the ends thereof to limit the pivotal movement of each of said arms away from each other; and a pair of suction cups, one rigidly secured to the outer ends of each of said arms, said arms being inwardly foldable against the underside of said load supporting member when not in use, and outwardly foldable to a position where said abutment means on said arms coact with said load supporting member to support said elongated member on a car top in spaced relation thereto.

2. A foldable luggage support device for removable attachment to the top of an automobile, comprising in combination: a rigid metallic elongated channel member defining, when supported in spaced relation to an automobile top, a load supporting surface; a pair of relatively short arms, each pivotally connected at one end to said channel member adjacent the outer ends thereof and depending downwardly therefrom below the flanges of said channel member; abutment means on each of said arms for coaction with said load supporting member at the ends thereof to limit the pivotal movement of each of said arms away from each other; said arms being inwardly foldable into inoperative position adjacent the flanges of said channel member, and being outwardly foldable to a position where said abutment means on said arms coact with said channel at the ends thereof; and a pair of suction cups, one secured to the outer ends of each of said arms, whereby said device may be removably attached to the top of an automobile in spaced relation thereto.

3. A device as defined by claim 1, in which there is attached to said load-supporting member means for releasably securing articles carried thereon.

4. A device as defined by claim 2, in which there is attached to said load-supporting member means for releasably securing articles carried thereon.

5. A device as defined by claim 1, which includes means attached to the said arms adjacent the suction cups for securing the device to the under exterior side of the conventional automobile rain gutter.

6. A device as defined by claim 2, which includes means attached to the said arms adjacent the suction cups for securing the device to the under exterior side of the conventional automobile rain gutter.

References Cited in the file of this patent

UNITED STATES PATENTS

| 2,391,945 | Christenson | Jan. 1, 1946 |
| 2,434,387 | Brandt | Jan. 13, 1948 |
| 2,436,228 | Purchase | Feb. 17, 1948 |
| 2,630,257 | Nielsen | Mar. 3, 1953 |